UNITED STATES PATENT OFFICE 2,509,198

PROCESS OF PREPARING MERCURY-, SILVER-, AND GOLD-MERCAPTO CARBOXYLIC ACIDS

Edmond E. Moore, Waukegan, Ill., assignor to Abbott Laboratories, North Chicago, Ill., a corporation of Illinois No Drawing. Application May 25, 1946, Serial No. 672,333

4 Claims. (Cl. 260—430)

This invention relates to organic compounds of heavy metals, including gold, mercury, and silver.

The compounds are of the general formula, M—S—CH$_2$—R$_1$; in which R$_1$ is a polyhydroxy alkyl group in which all oxygen atoms are present as hydroxyl groups, a di-alkyl amino alkyl group, or a hydrocarbon group containing at least one carboxyl group; M is the heavy metal; and the alkali, alkaline earth, and nitrogen base salts of said compounds if they are acids and the acid addition salts of said amino compounds. The acids themselves are, in general, water insoluble. The alkali metal salts of the acids are water soluble. Among the salts formed by these acids with nitrogen bases, those of ammonia, triethanolamine, monoethanolamine, and methylglucamine are very soluble in water and may be injected in the form of aqueous solutions. Those which are slightly soluble or insoluble in water may be suspended or dissolved in oil or a water solution of a gum such as acacia, ghatti, tragacanth, or karaya. The acid addition products of the amino compounds are, in general, water soluble. The compounds described herein are of therapeutic value or useful as intermediates in producing therapeutic compounds.

In the preparation of these compounds, a convenient starting material is the appropriate halogen substituted carboxylic acid. The net result of the series of reactions is the replacement of the halogen atom in the starting material by the metal-mercapto group, MS—. The bromo substituted acids are preferred although the chloro or iodo compounds may be used. If the chloro acids are used, the reaction is facilitated by the addition of an alkali metal bromide. The acid is reacted with thiourea, according to the method described in Beilstein, 4th ed., volume III, page 299, to produce the corresponding ω-carboxyalkylisothiourea. In place of an ω-carboxyalkylisothiourea, certain N substituted derivatives thereof e. g. β-carboxyethyl N, N'-dipyridyl isothiourea or S-β-carboxyethyl-2-mercapto imidazoline are satisfactory.

The ω-carboxyalkylisothiourea is suspended in water and sufficient alkali added to dissolve it.

In carrying out this reaction, sodium or potassium hydroxides are preferred. Ethanolamine can be used but does not give a white product. Ammonia and diethylamine fail to react under these conditions.

In some cases, the use of sulfur dioxide has been found to prevent darkening of the reaction products. The use of excess sulfur dioxide is to be avoided as it reacts with the gold halide. In order to eliminate the necessity of determining the exact amount of SO$_2$ to add in each experiment and the difficulty of measuring an exact amount of this gas, the following method was shown to be effective. The ω-carboxyalkylisothiourea is boiled with an excess of sulfur dioxide in water. The boiling is continued until no odor of sulfur dioxide is detected. The solution is cooled and remains clear due, probably to the formation of a compound.

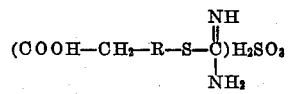

When sulfur dioxide is used, the quantity of sodium hydroxide in the next step is increased by an equivalent amount. Sodium bisulfite and metabisulfite can be used in place of sulfur dioxide.

In the preparation of the amine salts, it has been found that it is easier to secure a white product if one uses sodium or potassium hydroxide in the first step of the reaction, then isolates the water insoluble metal mercapto aliphatic acid by adding an inorganic acid, such as hydrochloric acid, dissolves this metal mercapto aliphatic acid in a concentrated aqueous solution of the amine and pours this aqueous solution into a solvent in which the amine salt of the metal ω-mercapto aliphatic acid is insoluble. Alcohol and acetone are among the solvents in which these amine salts are insoluble.

One equivalent of alkali may be used, but in most cases, two or more equivalents of the alkali are desirable because this excess of alkali dissolves the organic metal compound as it is formed and thus facilitates the reaction. In some cases, heating appeared to aid the reaction. An aqueous solution of the gold halide, for example, gold chloride or potassium gold bromide, is then added slowly to the stirred solution as long as the gold halide is decolorized. To secure a white product, it is usually advisable to use an excess of the ω-carboxyalkylisothiourea.

The invention may be illustrated by the following examples:

EXAMPLE I

*Sodium-δ-auromercaptovalerate*

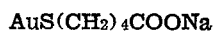

36.25 grams δ-carboxybutylisothiourea was dissolved in 750 cc. 0.2 normal sodium hydroxide. 150 cc. of 0.01 normal sulfur dioxide was added and the solution stirred. A slight haze was filtered off and a solution of 19 grams potassium gold bromide in 275 cc. water added over 40 minutes. The solution was stirred for fifteen minutes longer and then acidified with concentrated hydrochloric acid. A white precipitate of δ-auromercaptovaleric acid was formed. The precipitate was filtered, washed with water, and then dissolved in normal sodium hydroxide. The solution was filtered and poured into alcohol. A white precipitate of the sodium salt of δ-auromercaptovaleric acid was obtained. The product was filtered, washed with alcohol until free of alkali and dried in vacuo. Weight—25.7 grams. Soluble in water.

*Analysis.*—A one gram sample of the above sodium salt was converted to δ-auromercaptovaleric acid by dissolving in water acidifying with hydrochloric acid and filtering. The precipitate was washed with water, alcohol and ether and then dried.

Analysis calculated: Au, 59.69; C, 18.17; H, 2.74. Found: Au, 59.49; C, 18.36; H, 2.84.

EXAMPLE II 3.96 grams β-carboxyethylisothiourea was boiled with an excess of sulfur dioxide in water until a clear solution resulted. The boiling was then continued until no odor of sulfur dioxide could be detected. The solution was cooled and a clear solution remained, probably due to the formation of

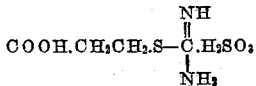

50 cc. of N/1 sodium hydroxide was added and the solution again heated to boiling. It was then cooled and 20 cc. of a gold chloride solution containing one gram of gold was added slowly to the well stirred solution. A slightly yellow solution resulted. On continued stirring for a few minutes, the solution became colorless. 5 cc. of concentrated hydrochloric acid was added to the well stirred solution to precipitate the AuSCH₂CH₂COOH. The mixture was centrifuged, washed with water, alcohol and ether and dried in a vacuum desiccator. Weight of white acid 1.5 grams.

*Analysis.*—Calculated for

AuS—(CH₂)₂—COOH: Au, 65.23%

Found Au, 63.53%.

The above would indicate a formula

AuS(CH₂)₂COOH½H₂O

Heated at 120° for one hour to remove solvent of crystallization, this gave:

Calculated for AuS—(CH₂)₂—COOH: Au, 65.23. Found: Au, 65.16.

By using the above methods and the appropriate acid as starting material, the following therapeutic compounds have been prepared:

| | M. P. |
|---|---|
| β-Auromercaptopropionic acid, AuS—CH₂—CH₂—COOH | 218–220° |
| δ-Auromercaptovaleric acid, AuS—(CH₂)₃—CH₂COOH | 227–230° |
| ε-Auromercaptocaproic acid, AuS—(CH₂)₄—CH₂COOH | 240–245° |
| β-methyl-ε-auromercaptocaproic acid, AuS—(CH₂)₂—CHCH₃CH₂CH₂COOH | 267–270° |
| ω-Auromercaptoundecylic acid, AuS—(CH₂)₉—CH₂—COOH | 265–268° (sodium salt) |

From β-auromercaptopropionic acid, the sodium, potassium, lithium, calcium, strontium, ammonium, monoethanolamine, triethanolamine, methylglucamine and diethylamine salts have been produced. The calcium and strontium salts are insoluble in water, the diethylamine salt is only slightly soluble and the balance of the salts mentioned are very soluble in water.

EXAMPLE III

*S-ε-carboxy amyl isothiourea*

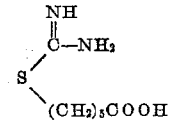

47 grams δ-bromocaproic acid, 18.24 grams thiourea and 100 cc. water were heated with stirring on a steam bath until a nearly clear solution resulted. This solution was filtered and to it was added with stirring a solution of 9.6 grams of sodium hydroxide in 225 cc. water. The pH of the resulting solution was 3.6. The product precipitated rapidly and was filtered off, washed and dried. Melting point 202–204° C.

Using the procedure of Example III and equimolecular quantities of the appropriate reagents, the following S-ω-carboxy alkyl isothioureas have been prepared:

| | M. P. |
|---|---|
| S-β-carboxy ethyl isothiourea | 182–183° |
| S-δ-carboxy butyl isothiourea | 197–198° |
| S-ε-carboxy amyl isothiourea | 202–204° |
| S-ω-carboxy-γ-undecyl isothiourea.HBr | 183–185° |
| S-ε-carboxy-γ-methyl amyl isothiourea | 186–189° |

EXAMPLE IV

*Gold thiosorbitol*

Au-SCH₂(CHOH)₄CH₂OH 1.98 grams thiosorbitol was dissolved in 40 cc. of water, 6.5 cc. of a sulfur dioxide solution containing 6.5 grams in 200 cc. was added.

1.11 grams potassium gold bromide was dissolved in 30 cc. of water and added slowly with stirring to the thiosorbitol solution. Precipitation of the gold thiosorbitol began at once. When all the gold thiosorbitol had been added, the precipitate was centrifuged, washed with water until the washings were free of halogens, then with alcohol and finally with ether. It was dried in a vacuum desiccator. The white solid weighed 0.78 gram.

*Analysis.*—Calculated for AuS—CH₂—(CHOH)₄—CH₂OH: Au=50.0. Found: Au=48.2.

EXAMPLE V

*ε-Auromercaptocaproic acid*

AuS(CH₂)₅COOH 39.25 grams ε-carboxyamylisothiourea was dissolved in 750 cc. of 2.7% aqueous sodium hydroxide and a solution of 11.25 grams sulfur dioxide in 150 cc. of water added. To this solution an aqueous solution of 47.5 grams potassium gold bromide in 440 cc. of water was added slowly with stirring. The solution was acidified with concentrated hydrochloric acid and a white precipitate of ε-auromercaptocaproic acid formed. This was filtered, washed with water until free of chlorides, and then with alcohol and ether. After drying in a vacuum desiccator over calcium chloride, a white solid resulted. Yield, 28.1 grams.

*Analysis.*—Calculated: Au, 57.3; C, 20.92; H, 3.21. Found: Au, 56.85; C, 20.82; H, 3.24.

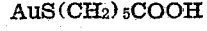

EXAMPLE VI

*ω-Auromercapto-γ-methylcaproic acid*

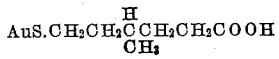

4.6 grams ω-carboxy-γ-methylamylisothiourea was dissolved in 80 cc. of water to which had been added 2.7 grams sodium hydroxide and 1.5 grams sulfur dioxide. 40 cc. of a 11% potassium gold bromide solution was run in slowly. A slightly cloudy solution resulted. A few cc. of 4% sodium hydroxide cleared the solution. 6.6 cc. of concentrated hydrochloric acid was added to precipitate the ω-auromercapto-γ-methylcaproic acid. The precipitate was washed with water until free of chlorides, then with alcohol and ether. Yield, 2.55 grams.

*Analysis.*—Calculated: Au, 55.02; C, 23.45; H, 3.65%. Found: Au, 55.54; C, 22.74; H, 3.53%.

EXAMPLE VII

*Sodium β-mercurimercaptopropionate*

$$Hg(SCH_2CH_2COONa)_2$$

2.716 grams mercuric chloride was dissolved in 100 cc. water and 4 cc. of 5 normal sodium hydroxide run in slowly with stirring. A heavy white precipitate resulted. 2.96 grams of β-carboxyethylisothiourea was dissolved in 58 cc. of 0.7 normal sodium hydroxide, heated to boiling, cooled, and added to the precipitate above. A clear liquid containing a trace of black colloid resulted. Hydrochloric acid was added until the first faint permanent precipitate formed. Norit was added and the solution filtered. A clear colorless filtrate resulted. The filtrate was divided into two equal portions.

One portion was poured into alcohol. A white precipitate formed. This was filtered and washed with alcohol. Weight—2.10 grams.

*Analysis.*—Calculated: Hg, 44.13. Found: Hg, 44.30.

EXAMPLE VIII

*β-Silvermercaptopropionic acid*

$$AgSCH_2CH_2COOH$$

1.7 grams of silver nitrate was dissolved in 40 cc. of 0.5 normal sodium hydroxide. A dark precipitate of silver hydroxide formed. 1.48 grams of β-carboxyethylisothiourea and 15 cc. of 1.0 normal sodium hydroxide were added. Most of the silver hydroxide dissolved. A second addition of 1.48 grams of β-carboxyethylisothiourea and 15 cc. 1.0 normal sodium hydroxide was made. Complete solution resulted. An excess of nitric acid was added. The white precipitate which formed was washed with water, alcohol and ether, and then dried in vacuo. Weight—1.5 grams.

*Analysis.*—Calculated: Ag, 50.70%. Found: Ag, 50.11%.

EXAMPLE IX

*β-Auromercaptoethyldiethylamine*

$$AuSCH_2CH_2N(C_2H_5)_2$$

1.0 grams β-diethylaminoethylisothioureahydrochloride was dissolved in 16 cc. of 0.75 normal sodium hydroxide. 2 cc. aqueous auric chloride solution (1 gram gold in 10 cc.) was added and the solution acidified with hydrochloric acid. 4 cc. aqueous auric chloride solution (1 gram of gold in 10 cc.) was added. The solution turned brown on each addition of gold but decolorized on standing. When the solution was made alkaline with ammonium hydroxide, a white precipitate formed. Centrifuged; washed with water; dried; washed with ether; dried. Weight of residue, 0.5 gram.

*Analysis.*—Calculated: Au, 59.78; C, 21.78; H, 4.25. Found: Au, 59.99; C, 21.83; H, 4.36.

EXAMPLE X

*γ-Auromercaptopropyldiethylamine*

$$AuSCH_2CH_2CH_2N(C_2H_5)_2 \cdot HCl$$

γ - Diethylaminopropylisothiourea hydrobromide was converted into γ-auromercaptopropyldiethylamine by the same method as used in Example IX. The compound is soluble in ether from which its hydrochloride was isolated as a white compound by adding a solution of hydrogen chloride gas in ether.

*Analysis.*—Calculated: Au, 51.91%. Found: Au, 52.25%.

EXAMPLE XI

*β-Auromercaptopropionic acid*

$$AuS(CH_2)_2COOH$$

[From sodium thiosulfate and sodium β-brompropionate]

15.3 grams β-brompropionic acid was dissolved in a solution of 6.2 grams of sodium carbonate monohydrate in 25 cc. of water. 24.8 grams of sodium thiosulfate pentahydrate was dissolved in 40 cc. of water. The two solutions were mixed and refluxed for two hours. The solution was cooled and acidified with concentrated hydrochloric acid. Thirty cc. of this solution was refluxed for thirty minutes and cooled. Ten cc. of a 7.5% aqueous auric chloride solution was then added. A white precipitate of β-auro mercaptopropionic acid, weight—0.81 gram, was formed.

*Analysis.*—Calculated: Au, 65.23%. Found: Au, 65.47%.

EXAMPLE XII

*δ-auro mercaptovaleric acid*

$$AuS(CH_2)_4COOH$$

This experiment was identical with Example XI, except that instead of β-bromopropionic acid, 18.1 grams of δ-bromovaleric was used.

A white precipitate of δ-auro mercaptovaleric acid, weight 0.91 gram, resulted.

*Analysis.*—Calculated: Au, 59.69%. Found: Au, 59.15%.

Heavy metal compounds of this type find therapeutic use in treatment of several conditions including arthritis. For instance, the intramuscular administration of gold organic compounds in doses of the order of magnitude of from 5 to 50 milligrams is of value in arresting the development of arthritis. In this and other therapeutic uses, the therapeutic active factor is believed to be the metal itself and the problem is to employ a vehicle of maximum stability and convenience and minimum toxicity. Tests have shown that the compounds enumerated herein are superior to previous compounds used for the same therapeutic purpose, particularly with respect to stability, convenience, and low toxicity. Specifically they are of lower toxicity than the known compound Au—S—CH₂—COOH.

It will be obvious that any one of the heavy metals discussed herein may be combined with any one of the thioacids disclosed. In this and other ways others may readily adapt the invention for use under various conditions of service by employing the novel features disclosed, or equivalents thereof. As at present advised, with respect to the apparent scope of my invention, I desire to claim the following subject matter.

I claim:

1. In the process of preparing auromercapto-aliphatic acids, the improvement which consists in dissolving a ω-carboxyalkylisothiourea in an aqueous solution of an alkali metal hydroxide, treating the solution with a small amount of sulfur dioxide, adding gold halide to the alkaline solution, acidifying the resulting reaction mixture and recovering the auromercapto-aliphatic acid precipitate therefrom.

2. In the process of preparing auromercapto-aliphatic acids, the improvement which consists in treating an aqueous suspension of a ω-carboxyalkylisothiourea with sulfur dioxide, boiling the resulting reaction mixture to remove excess sulfur dioxide, dissolving the ω-carboxyalkylisothiourea in an aqueous solution of an alkali metal hydroxide, adding gold halide to the alkaline solution, acidifying the resulting reaction mixture, and recovering the auromercapto-aliphatic acid precipitate therefrom.

3. In the process of preparing mercapto-carboxylic acids of the formula

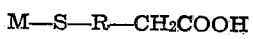

M—S—R—CH₂COOH where M is a heavy metal selected from the group consisting of gold, mercury and silver and R represents an alkylene group, the improvement which consists in reacting a carboxy—CH₂—R—isothiourea with a water soluble salt of the heavy metal and an alkali in an aqueous reaction medium, acidifying the alkaline reaction mixture and recovering the resulting M—S—R—CH₂COOH precipitate from the acidified mixture.

4. In the process of preparing auromercapto-carboxylic acids of the formula

Au—S—R—CH₂COOH where R represents an alkylene group, the improvement which consists in reacting a carboxy—CH₂—R—isothiourea with an alkali metal gold halide salt and an alkali metal hydroxide in an aqueous reaction medium, acidifying the alkaline reaction mixture and recovering the resulting Au—S—R—CH₂COOH precipitate from the acidified mixture.

EDMOND E. MOORE.

REFERENCES CITED

The following references are of record in the file of this patent:

UNITED STATES PATENTS

| Number | Name | Date |
|---|---|---|
| Re. 16,921 | Kharasch | Apr. 3, 1928 |
| 1,207,284 | Feldt et al. | Dec. 5, 1916 |
| 1,683,104 | Schoeller et al. | Sept. 4, 1928 |
| 2,036,208 | Feldt et al. | Apr. 7, 1936 |
| 2,049,198 | Delange | July 28, 1936 |
| 2,111,151 | Muller | Mar. 15, 1938 |
| 2,143,388 | Schlack | Jan. 10, 1939 |
| 2,323,075 | Orthner et al. | June 29, 1943 |
| 2,352,124 | Sabin et al. | June 20, 1944 |
| 2,370,593 | Trenner et al. | Feb. 27, 1945 |
| 2,424,007 | Moore et al. | July 15, 1947 |
| 2,440,729 | Signaigo | May 4, 1948 |

FOREIGN PATENTS

| Number | Country | Date |
|---|---|---|
| 156,103 | Great Britain | Mar. 2, 1922 |
| 266,824 | Great Britain | Mar. 7, 1927 |
| 363,820 | Germany | Nov. 14, 1922 |
| 399,904 | Germany | Aug. 2, 1924 |
| 544,500 | Germany | Feb. 22, 1932 |
| 129,303 | Australia | July 25, 1932 |

OTHER REFERENCES

Drummond: Jour. Chem. Soc. (London), 1926, p. 3076.

Andreasch: Monatshefte für Chemie, vol. 6, p. 832.

Carius: Annalen der Chem. und Pharm., vol. 124, pp. 224 and 225 (1862).

Beilstein: "Handbuch der Chemie," vol. 3 (4th ed., 1921), pp. 299–300, abstracting paper by Andreasch in "Monatshefte," vol. 6, p. 832.

Loven: "Jour. für prakt. Chem.," vol. 137 (neue Folge, vol. 29) (1884), pp. 376–377.

Certificate of Correction

Patent No. 2,509,198 — May 30, 1950

EDMOND E. MOORE

It is hereby certified that error appears in the printed specification of the above numbered patent requiring correction as follows:

Column 4, line 30, for "S-ω-carboxy-γ-undecyl" read *S-ω-carboxy undecyl*;

and that the said Letters Patent should be read with this correction therein that the same may conform to the record of the case in the Patent Office.

Signed and sealed this 19th day of September, A. D. 1950.

[SEAL]

THOMAS F. MURPHY,
*Assistant Commissioner of Patents.*